Jan. 21, 1964
G. J. SHAW
3,118,267
LAWN MOWER
Filed April 27, 1962
2 Sheets-Sheet 1
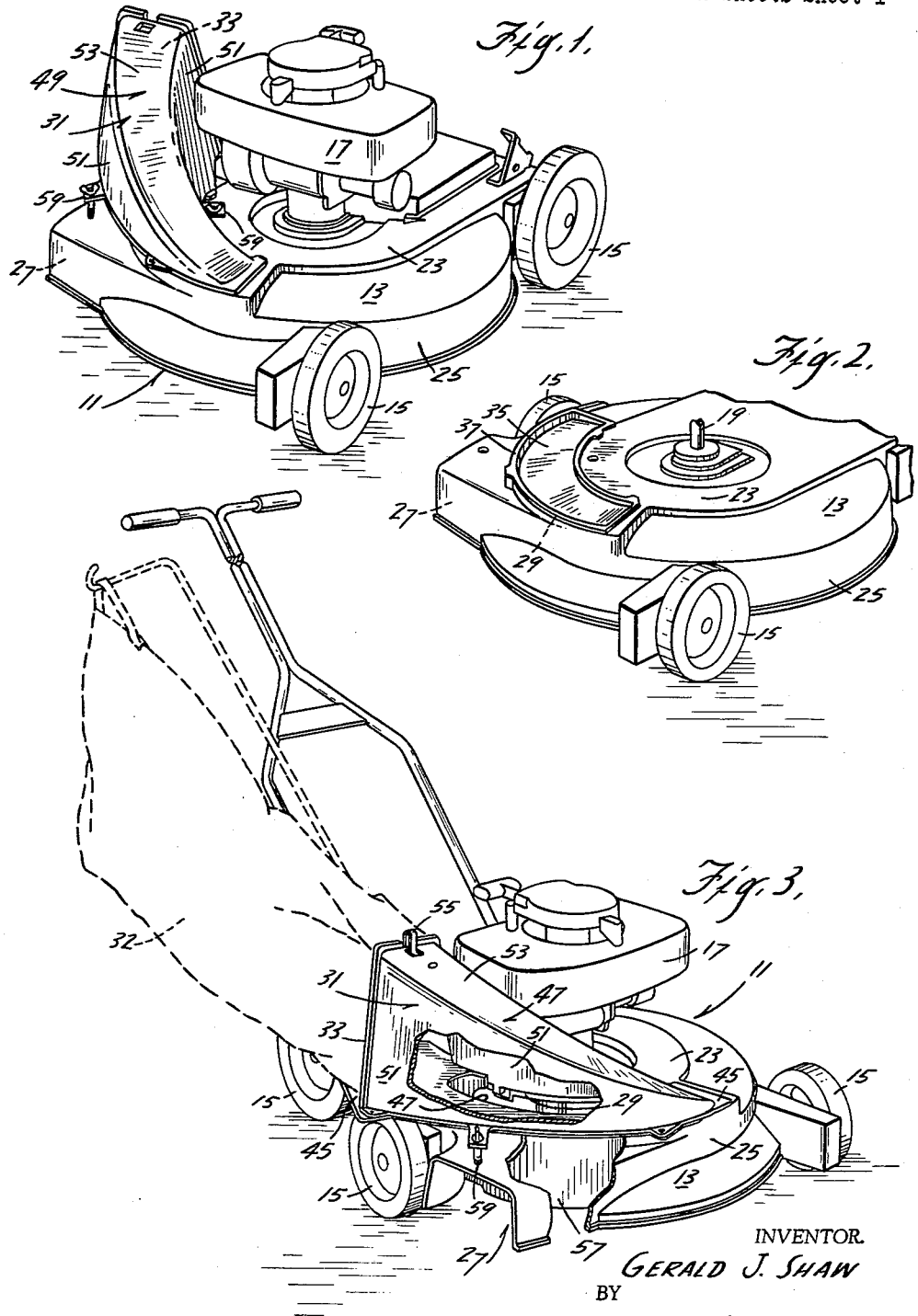
INVENTOR.
GERALD J. SHAW
BY
Wheeler, Wheeler & Wheeler
ATTORNEYS.

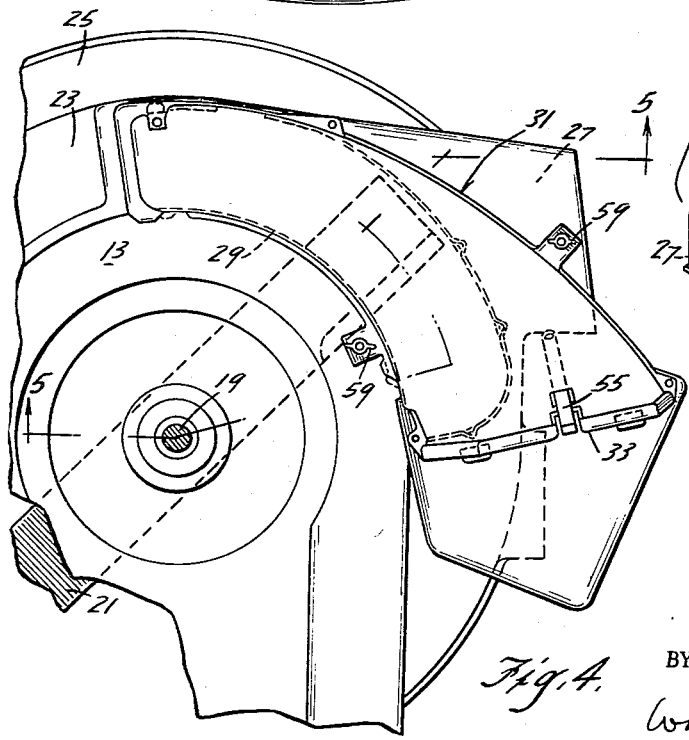

United States Patent Office 3,118,267
Patented Jan. 21, 1964

3,118,267
LAWN MOWER
Gerald J. Shaw, Lamar, Mo., assignor to Outboard Marine Corporation, Waukegan, Ill., a corporation of Delaware
Filed Apr. 27, 1962, Ser. No. 190,551
3 Claims. (Cl. 56—25.4)

The invention relates generally to rotary type lawn mowers. More particularly, the invention relates to discharge arrangements from the housing containing the rotary cutting blade.

The invention contemplates a blade housing including two spaced discharge ports permitting alternate arrangements for discharge from the housing, together with means securable to the housing to control discharge therefrom by selective blocking of the discharge ports. In the preferred construction, one of the discharge ports is located in the side wall with its opening in a vertical plane and the other of the ports is located forwardly in the top wall of the housing with its opening disposed generally in a horizontal plane. The top port is closable to provide for side discharge by a cover plate which is releasably securable to the housing. Alternatively, the cover plate can be removed from covering relation to the top port and a chute assembly secured to the housing in communication with the top port. Preferably, the chute assembly curves around the motor for discharge rearwardly into a catcher or collector trailing generally behind the mower, thereby substantially reducing the overall width of the mower and catcher combination. In addition, the chute assembly preferably includes a baffle which projects through the top port in blocking relation to the side port.

Other objects and advantages of the invention will become apparent by reference to the following description and the accompanying drawings of the invention, in which FIGURE 1 is a perspective view of the front, top, and one side of one embodiment of a lawn mower which incorporates various of the features of the invention and is arranged for rearward discharge;

FIGURE 2 is a fragmentary perspective view, similar to FIGURE 1, showing the lawn mower of FIGURE 1 arranged for side discharge;

FIGURE 3 is a partially broken away and partially sectioned perspective view of the front, top, and other side of the lawn mower as shown in FIGURE 1;

FIGURE 4 is an enlarged fragmentary plane view of the lawn mower shown in FIGURE 1, with the motor omitted;

FIGURE 5 is a sectional view taken generally along line 5—5 of FIGURE 4, showing the lawn mower in its rearward discharge arrangement;

FIGURE 6 is a fragmentary sectional view similar to FIGURE 5 showing the lawn mower in its side discharge arrangement;

FIGURE 7 is a perspective view of the chute assembly shown in FIGURES 1 and 3; and FIGURE 8 is an exploded perspective view of the cover plate and blade housing which are shown in FIGURE 2.

Shown in the drawings is a rotary-type lawn mower 11 which includes a blade housing 13 conventionally supported for travel in adjacent relation to the ground by a set of wheels 15. Carried centrally on top of the blade housing is a motor 17, such as an internal combustion engine or electric motor, and a suitable starter and controls. The motor 17 includes an output or crankshaft 19 (see FIGURES 2 and 4) which extends into the blade housing 13 and carries a cutting blade 21 (see FIGURES 4, 5 and 6) of conventional construction.

The disclosed blade housing 13 generally includes a top 23 and a generally circular peripheral skirt 25 which extends adjacent to the ground. Incorporated in the blade housing 13 are two discharge ports, i.e., one side port 27 which extends generally tangentially from the peripheral skirt and has its opening located in a generally vertical plane, and a generally forwardly located, arcuately extending port 29 in the top 23 of the housing 13, which port 29 has its opening disposed in a generally horizontal plane. The top port 29 is disposed in spaced but generally angularly adjacent relation to the tangentially extending side port 27.

As will be seen, the side port 27 permits side discharge, while the top port 29, in co-operation with a chute assembly 31, permits rearward discharge into a catcher or collector 32 disposed in trailing relation to the blade housing 13. In this regard, the chute assembly 31 extends from the top discharge port 29 curvilinearly around the motor 17 to a rearwardly open discharge opening 33. Preferably, as seen best in FIGURE 4, the chute assembly 31 extends for only a relatively minor distance outwardly from the housing, thereby effectively minimizing the overall width of the mower and catcher combination.

The top discharge port 29 can be closed or blocked to permit side discharge by a cover plate 35 including a peripheral flange 37 (see FIGURES 6 and 8) which is supported on a lip 39 defining the top discharge port 29.

The side discharge port 27 is blocked to permit rearward discharge by means of the afore-mentioned chute assembly 31. More specifically, the chute assembly 31, as seen best in FIGURE 7, includes a generally flat base plate 45 having an aperture 47 which generally corresponds to the area of the top discharge port 29. Also included in the chute assembly 31 is a shroud 49 which is secured to the base plate 45 in generally covering relation to the aperture 47. The shroud 49 includes curvilinearly extending side walls 51 adapted to extend from in front of the motor around to the side thereof, and a rearwardly and upwardly inclined top wall 53. At its rearward end, the chute assembly 31 includes the before-mentioned discharge opening 33 and suitable means 55 adjacent the discharge opening 33 for attaching a grass bag or other type of collector.

Also secured to the base plate 45, in downwardly depending relation therefrom, for extension to adjacent the bottom of the housing skirt 25, is a curved baffle 57 which serves to block the side discharge port 27. More particularly, the baffle 57 extends through the top port 29 when the chute assembly 31 is secured to the blade housing 13 and extends rearwardly from about the point of tangency with the skirt 25 of the side discharge port 27 to beyond the side discharge port in a curved disposition at a radius corresponding generally to the radius of the peripheral skirt 25. At its rearward end, i.e., beyond the side discharge port 27, the baffle 57 curves radially inwardly to direct the discharge upwardly through the top port 29. The radially inwardly curving part of the baffle 57 is of lesser depth to permit free rotation of the cutting blade 21.

The cover plate 35 and chute assembly 31 can be selectively retained or secured in releasable assembly with the blade housing 13 by various means. In the disclosed construction, the cover plate 35 is releasably secured to the blade housing 13 in proper covering relation to the top port 29 by means including a spring (not shown) and a series of lugs 41a, one of which is shown in FIGURE 6, which lugs 41a engage corresponding formations 43 on the blade housing 31 to positively locate the cover plate 35 relative to the housing 13. In addition, the base plate 45 and baffle 57 of the chute assembly are provided with a series of lugs 41b (see FIGURE 5), corresponding to the lugs 41a on the cover plate 45, for co-operation with the formations 43 to thereby facilitate removable assembly of the chute assembly 31 to the housing 13 in the same manner as the removable assembly of the cover plate 35 to the housing 13. Further releasable connection means, such as the bolted connections 59 seen in FIGURES 1, 3, 4, and 5, can also be employed.

Various of the features of the invention are set forth in the following claims.

What is claimed is:
1. A rotary type lawn mower including
   a blade housing adapted to be propelled in adjacent relation to the ground and including a top discharge port in the top wall of said blade housing and a side discharge port in the side wall of said blade housing and in spaced relation to said top discharge port, and
   a chute secured to said housing in communication with said top discharge port and including a baffle projecting through said top discharge port into position in blocking relation to said side discharge port.
2. A lawn mower in accordance with claim 1 wherein said top discharge port is located forwardly in the top wall of said blade housing,
   a motor is centrally mounted on the top wall of said blade housing, and
   said chute curves around said motor and includes a rearwardly facing discharge opening.
3. A rotary type lawn mower including
   a blade housing adapted to be propelled in adjacent relation to the ground and including a top wall having a top discharge port therein, and
   a peripheral skirt extending from said top wall to adjacent the ground and including a side discharge port therein, and
   a chute detachably connected to said housing in communication with said top discharge port and including a baffle extending in blocking relation to said side discharge port.

References Cited in the file of this patent
UNITED STATES PATENTS

| | | |
|---|---|---|
| 2,857,727 | Cole | Oct. 28, 1958 |
| 2,910,818 | Beal et al. | Nov. 3, 1959 |
| 2,942,400 | Sylvester | June 28, 1960 |
| 2,955,402 | Strasel | Oct. 11, 1960 |
| 2,957,295 | Brown | Oct. 25, 1960 |
| 2,973,614 | Horner et al. | Mar. 7, 1961 |
| 2,990,666 | Blume | July 4, 1961 |